April 11, 1944.　　　O. E. STAPLES　　　2,346,515
TURNING MACHINE
Filed Feb. 2, 1943　　　4 Sheets-Sheet 1

FIG. 1

INVENTOR.
OTIS E. STAPLES
BY Kwis Hudson & Kent
ATTORNEYS

April 11, 1944.  O. E. STAPLES  2,346,515
TURNING MACHINE
Filed Feb. 2, 1943      4 Sheets-Sheet 4

FIG. 6

INVENTOR.
OTIS E. STAPLES
BY Kwis Hudson & Kent
ATTORNEYS

Patented Apr. 11, 1944

2,346,515

UNITED STATES PATENT OFFICE 2,346,515

TURNING MACHINE

Otis E. Staples, Euclid, Ohio, assignor to The Cleveland Hobbing Machine Company, Euclid, Ohio, a corporation of Ohio Application February 2, 1943, Serial No. 474,433

16 Claims. (Cl. 82—3)

The present invention relates to machines generally referred to as machine tools and intended primarily for working metal but capable of working other material, such as plastics, wood and the like. More particularly, the invention relates to a machine tool of novel and improved design and construction for forming or cutting metal and similar materials wherein a work blank is rotated in cutting relationship with a disk or sector-like tool, slowly rotated about an axis offset from and angularly disposed with respect to the axis of rotation of the work at constant or variable speeds, either continuously or intermittently, but in predetermined relation to a relative feed movement effected between the work and tool longitudinally of the axis of rotation of the work.

The principal object of the present invention is the provision of a machine of novel and improved design and construction wherein a work blank is rotated about a vertical axis in cutting relationship with a disk or sector-like tool, slowly rotated about a horizontal axis offset from the axis of rotation of the work at a constant or variable speed, either continuously or intermittently, but in predetermined relationship to a relative feed movement effective between the work and tool in a vertical direction.

Another object of the invention is the provision of a machine of novel and improved design and construction for working metal and the like wherein a work blank is carried by a vertically movable work head and rotated about a vertical axis in cutting relationship with a disk or sector-like tool, slowly rotated about a horizontal axis offset from the axis of rotation of the work at constant or variable speeds, either continuously or intermittently, but in predetermined relationship to a relative feed movement between the work and tool effective by vertical movement of the work head.

Another object of the present invention is the provision of a machine of novel and improved design and construction comprising one or a plurality of units for working metal and the like wherein a work blank is rotated about a vertical axis in cutting relationship with a disk or sector-like tool, slowly rotated about a horizontal axis offset from the axis of rotation of the work at constant or variable speeds, either continuously or intermittently, but in predetermined relationship to a vertical relative feed movement between the tool and the work produced by a vertical movement of a work carrying head slidably supported on a rotatable turret, which vertical movement is effected by a stationary circular cam as the turret is rotated to carry the work head or heads in a closed path.

Another object of the invention is the provision of a machine of novel and improved design and construction comprising a plurality of units for working metal and the like supported on a rotatable turret, each of which units comprises an individual motor-driven work spindle and wherein the feed movement between the tool and the work is produced by a common cam and in which the turret cannot be rotated until all of the work spindles not in loading position are rotating.

Another object of the invention is the provision of a machine or machines of the character referred to above wherein the work supporting spindle is in axial alignment with the motor which drives the same.

The present invention resides in certain details of construction and combinations and arrangements of parts and further objects and advantages will be apparent to those skilled in the art to which the invention relates from the following description of the preferred embodiment described with reference to the accompanying drawings forming a part of this specification in which similar reference characters designate corresponding parts, and in which.

Machines of the character here involved are intended primarily for mass production operations, the principal requirements of which are extreme accuracy, high production and unusual dependability. Machines which meet the requirements of accuracy and production and which can be depended upon for continuous operation over long periods of time with minimum care and maintenance must be simple in design and rigid in construction. In the present instance, these desirable features are attained by simplifying not only the operations but also the operating mechanism as much as possible by reducing the movable parts of the machine to a minimum and so supporting them as to obtain maximum rigidity. Upon consideration of the preferred embodiment of the invention shown in the drawings and herein described, it will be evident that the present invention accomplishes the rapid production of fairly complicated articles by an extremely simple and rigid machine.

Referring to the drawings, the reference character A designates a frame comprising a circular or disk-like base 10 and a central vertical column 11. As shown, the column 11 is formed separate from the base 10 and bolted thereto, but the frame may be formed as a single member, if desired. A turret B rotatably supported on the column 11 by bearings 12 and 13 includes a plurality of working units, each comprising tool and work supporting means. In the present instance, eight working units are shown but it is to be understood that any suitable number of units may be employed. The working units are substantially identical in construction, and only one will be described in detail.

In each instance, the work W is supported for rotation about a vertical axis in a work head C recipocably supported for vertical movement on the turret proper by vertically spaced pairs of ways 14 and 15, and the tool T for rotation about a horizontal axis by a tool head D slidably supported for adjustment or movement towards and from the work in a cylindrical aperture or way 16 intermediate the upper and lower pairs of ways 14 and 15, respectively, which support the work head. The work head C carries a work spindle 17 rotatably supported therein by antifriction bearings 18 and 19 and to the upper end of which spindle one end of the work W is connected by a chuck E of any appropriate construction so long as the work can be rotated thereby about a fixed center or axis. The other or upper end of the work W is supported by a tail center 20 carried by a tail stock 21 slidably supported on vertical ways 22 and 23 formed on the side of the work head C. The tail stock is adapted to be moved vertically and clamped into any position to which it is moved by a single manually operated lever 24. The construction and operation of the tail stock shown is similar to that shown in U. S. Patent No. 2,231,866 and will not be herein further described.

Figure 2:
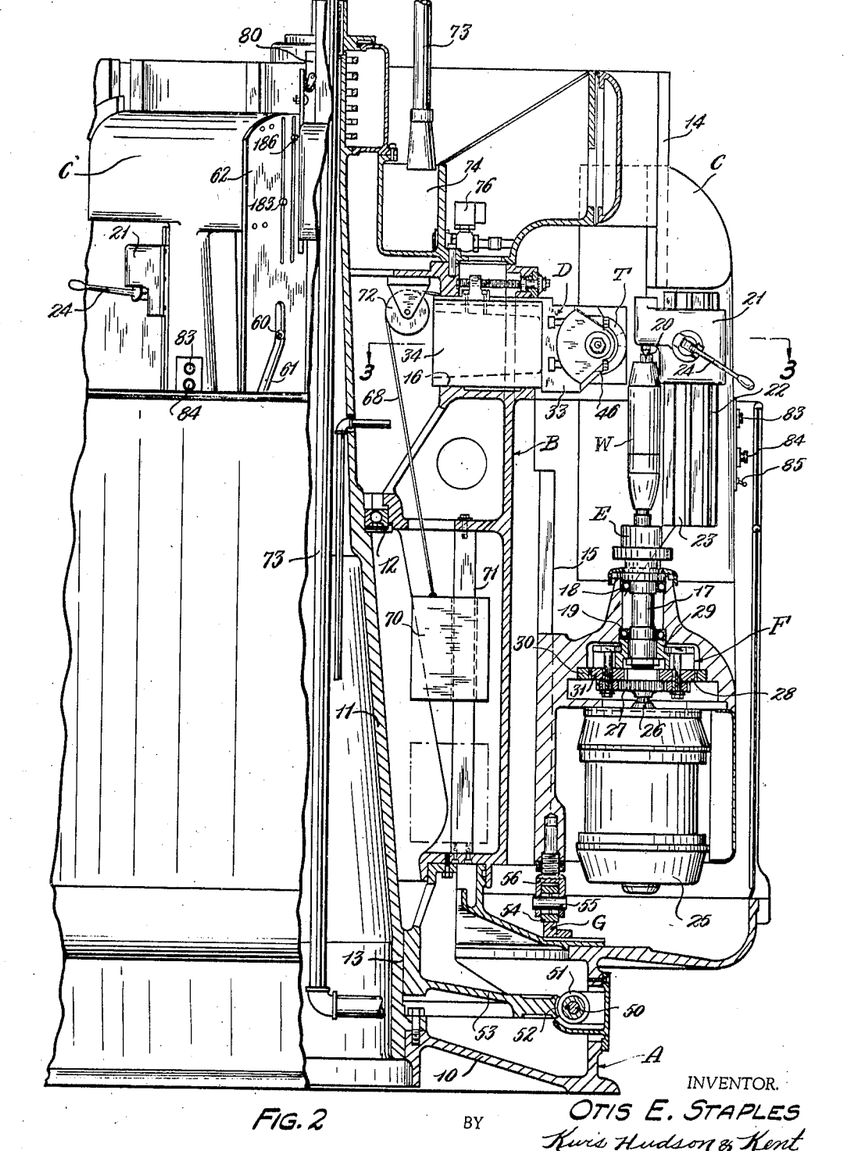
Fig. 2 is an elevational view of a part of the machine shown in Fig. 1, with portions in section, approximately on a center plane of the machine through one of the work-supporting spindles.

The work spindle 17 is rotated by a two-speed electric motor 25, the armature shaft 26 of which is in axial alignment therewith and operatively connected thereto by a planetary gear transmission, designated generally by the reference character F, the sun gear 27 of which is connected to the armature shaft 26 of the motor, while the planet gears 28, each of which is of the multiple type, are carried by a spider member 29 fixed to the lower end of the work spindle 17. The lower gear of each of the planet gears, as viewed in Fig. 2, is in mesh with the sun gear 27 while the upper gear thereof is in mesh with an internal orbit gear 30. The planet gears are rotatably supported on bolts 31 secured in slots in the spider member 29 so that planet gears of different sizes from those shown may be employed, thus providing means for changing the speed of rotation of the work spindle without changing the speed of rotation of the motor.

Figure 3:
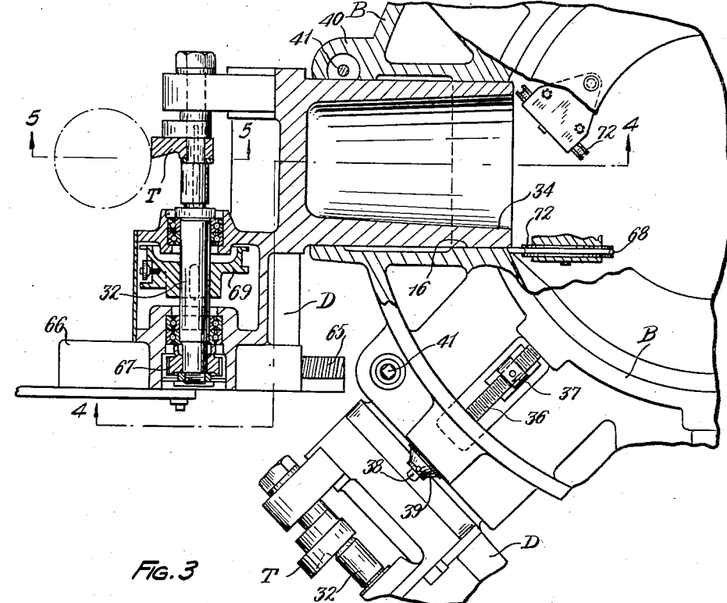
Fig. 3 is a sectional view of a part of the machine, with portions in elevation, approximately on the line 3—3 of Fig. 2.
Figure 4:
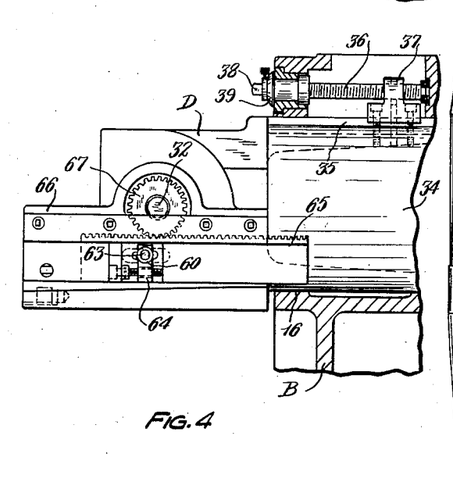
Fig. 4 is a side elevational view of a part of the machine, with portions in section, approximately on the line 4—4 of Fig. 3.

The tool T, which will be hereinafter more specifically described, is carried by a tool spindle 32 rotatably supported in the forward portion 33 of the tool head D, which tool head also comprises a rearwardly extending cylindrical portion 34 slidably supported in the horizontal cylindrical aperture or way 16. The tool head D is prevented from rotating in the cylindrical way 16 by a key 35 carried by the cylindrical parts 34, which key projects into suitable key ways in the turret proper. As shown, the tool head may be adjusted or moved towards or away from the axis of rotation of the work spindle by an elongated screw 36 rotatably supported in the turret, the threads of which engage a nut-like member 37 fixed to the key 35 and in turn to the cylindrical portion 34 of the tool head. The forward end of the screw 36 is provided with a square driving connection 38 adapted to be engaged by a crank or the like for rotating the same and has a dial 39 fixed thereto to facilitate setting up the machine, etc. If desired, a suitable clamp may be provided for clamping the tool head in any adjusted position in the cylindrical way 16. Such a clamp is employed in the preferred construction, but since it per se forms no part of the present invention, it will not be described in detail. Suffice it to say that it comprises a plurality of cylindrical members, one of which is shown in Fig. 3 where it is identified by the reference character 40. The clamp members are located in an aperture opening into one side of the aperture 16 and extending transversely thereof and have threaded engagement with a screw 41, the upper end of which projects to the outside of the tool head. The construction is such that the clamp members can be moved toward each other to clamp the tool head or moved apart to release the same by rotating the screw 41.

Figure 1:
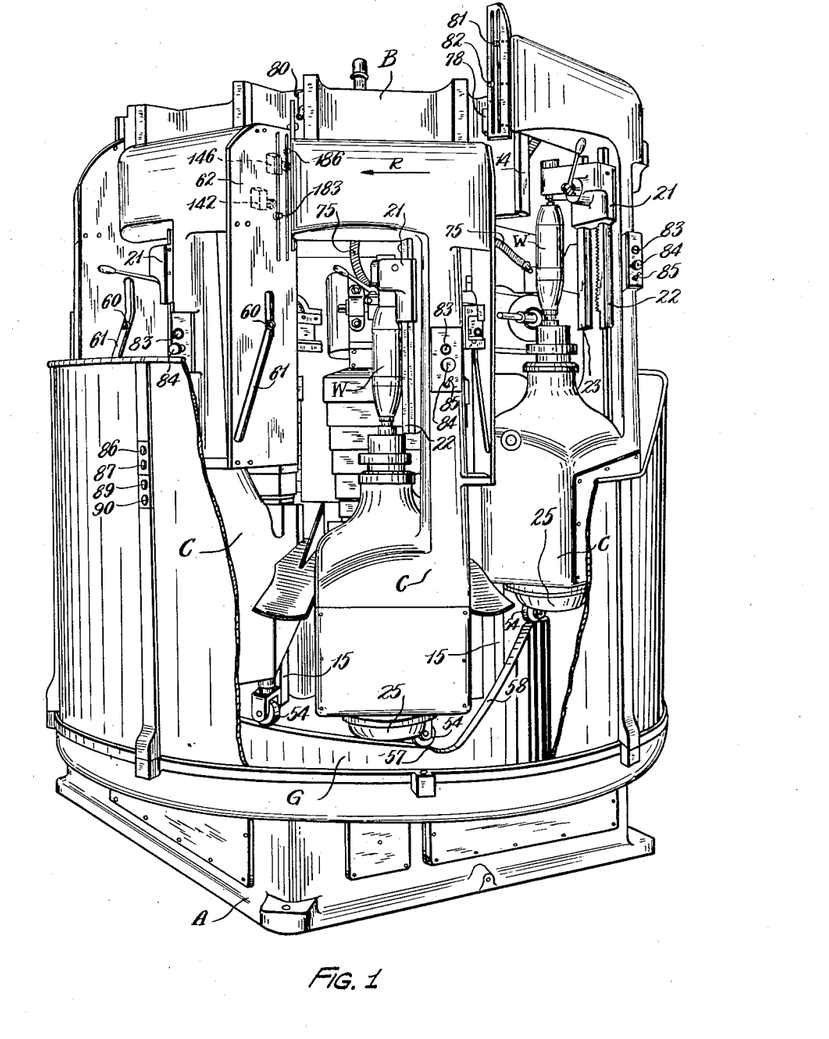
Fig. 1 is a perspective view of a machine embodying the present invention with portions broken away.
Figure 5:
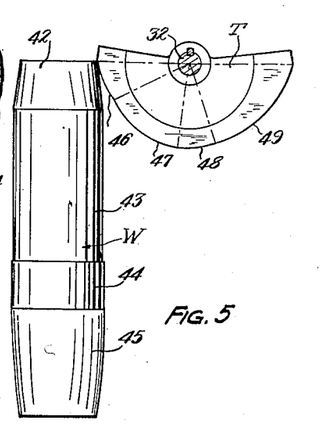
Fig. 5 is a sectional view on the line 5—5 of Fig. 3, with the work in elevation.

As previously stated, the tool T is disk or sector-like and has radially offset, arcuate-shaped cutting edge portions which cut portions of different diameter on the work as the work is rotated at a relatively high speed about an axis offset from and angularly disposed with respect to the axis of rotation of the tool. As the work is moved vertically past the tool, the tool is slowly rotated to bring the various cutting edge portions into cutting position. Referring to Fig. 5 the various diameters 42, 43, 44 and 45 of the work W are cut by the cutting edge portions 46, 47, 48 and 49, respectively, of the tool T. The various movements incident to the cutting operation other than the rotation of the work are effected in the following manner:

During operation of the machine, the turret B is continuously rotated by an electric motor 59 attached to the base 10 and operatively connected to a shaft 50 carrying a worm 51 continuously in mesh with a large worm wheel 52 formed on the periphery of an annular flange 53 on the lower part of the turret. As the turret B rotates, the work head C is reciprocated vertically by a ring-like cam G secured to the base of the machine, the upper surface of which cam is engaged by a roller 54 carried by a short shaft 55 fixed in a member 56 adjustably secured to the bottom of the work head. The construction of the cam is such that as the work head leaves the loading station, the roller 54 travels up the incline 57, see Fig. 1, which quickly brings the work up to the tool. Continued movement of the roller 54 along the cam raises the work head at a slower feed rate until the work is moved past the tool, whereupon the work is removed and the work head returned to loading position by the roller 54 traveling down the incline 58.

While the work head is being raised slowly, the tool is rotated in predetermined timed relation to the movement thereof by a roller 60 projecting into a cam slot 61 in a cam plate 62 removably bolted to the work head. The roller 60 is carried by a pin 63 fixed to a member 64 adjustably connected to a rack 65 slidably supported in an extension 66 of the tool head D. The rack 65 is continuously in mesh with a gear 67 keyed to one end of the tool spindle 32. The tool spindle is continuously urged in a counterclockwise direction, as viewed in Figs. 2 and 5, by a flexible band 68, one end of which is secured to a grooved pulley 69 and the other end to a weight 70 slidably supported on a bar 71 fixed in the turret. The band 68 passes over a sheave 72 rotatably supported in the turret and so located as to hold the band 68 clear of other parts of the machine. The construction is such that the weight 70 continuously but yieldably urges the tool spindle in a counterclockwise direction, as viewed in Figs. 2 and 5, keeping the roller 60 in contact with one side of the cam slot 61. It will be apparent that as the work head C moves in an upward direction carrying the cam plate 62 therealong, the roller 60 and, in turn, the rack 65 are permitted to move or are moved in a forward direction under the influence of the weight 70 and/or the cam slot 61. Movement of the rack 65 in the direction mentioned rotates the tool T so that the various cutting edge portions are successively brought in contact with the work. The cam slot 61 has an elongated vertical portion at the upper end which permits the work head to be moved from its lower or loading position to a position where the work is about to engage the tool without producing any movement of the tool T. However, it will be understood that this feature of the construction may be eliminated.

While in the embodiment of the invention shown the tool is continuously rotated during the cutting operation at a constant speed, assuming that the work head is moved at a constant speed, it is to be understood that the tool may be rotated either continuously or intermittently and at constant or variable speeds, as desired. The particular design of the tool employed to produce any given work will depend upon the manner in which the tool is rotated, etc. Obviously the design of the tool and the design of the cam slot for rotating the same are functions of each other, as well as the shape of the work to be produced.

Cutting fluid is supplied to the various metal working units by a motor-driven pump (not shown) located in the base of the machine through a pipe 73 which discharges into an annular trough 74 formed in the top of the turret B. From the trough 74 the cutting fluid is fed by gravity to the metal working units by outlet pipes 75 controlled by solenoid valves 76. The motor for the pump is designated on the wiring diagram by the reference character 77. As previously stated, the cut motor 25 shown is a two-speed motor and the various speeds are selected in a manner hereinafter more specifically referred to by roller-type switches 78 and 80, hereinafter referred to as high and low speed selector switches, respectively. The switches 78 and 80 are mounted on the turret B adjacent to the ways 14 and are actuated by stops 81 and 82 carried by the upper part of the spindle head C and adjustable vertically in slots provided therein. Each metal working head is provided with start and stop push button switches 83 and 84 and a snap switch 85 for controlling the solenoid valve 76. In addition, the machine is provided with master start and stop push buttons 86 and 87 and turret rotation start and stop push buttons 88 and 90. The machine is so wired that in order to start the rotation of the turret B, the operator must press the master start push button 86 and each of the individual unit start push buttons 83 prior to pushing the turret start push button 88, thus making it impossible to feed a non-rotating work blank into a cutter.

*Operation*

Figure 6:
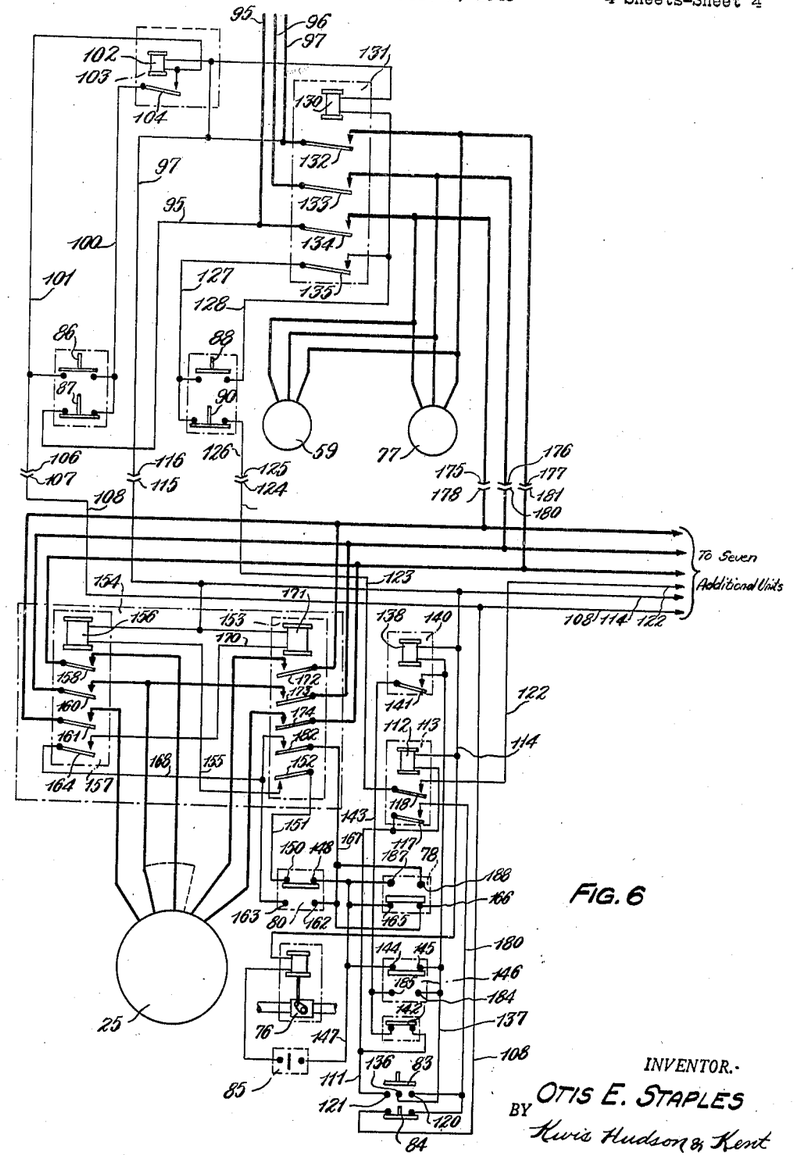
Fig. 6 is a wiring diagram of the machine.

With power supplied to the machine by the power lines 95, 96 and 97, the operator first pushes the master start push button 86 closing the normally open contacts thereof and establishing a circuit from the line 95 through the master stop push button switch 87, line 100, start push button 86, line 101, operating solenoid 102 of master relay 103 to line 97. Energization of the operating solenoid 102 of master relay 103 closes the normally open contacts 104 thereof, which contacts are in parallel circuit with the master start push button switch 86 and maintain the relay energized after the master start push button switch 86 is released. In addition to being connected to one side of the operating solenoid 102 of the master relay 103, the wire 101 is connected to a collector ring 106 continuously engaged by a brush 107, connected to a wire 108 leading to the spindle stop push button switches 84 located on the respective work heads C. With the wire 108 connected to the power line 95, the motors 25 and, in turn, the work spindles of the respective work heads, with the exception of the motor of the work head located in the loading station, can be started by pressing the respective spindle start push button switch 83. The work heads are duplicates of each other insofar as the control circuits are concerned and they will not all be described in detail. As will be hereinafter apparent, all of the work spindles, with the exception of the work spindle of the work head in the loading station, must be started before the turret B can be rotated, and the spindle start push button switch 83 on the work head located in the loading station must have been depressed.

When the operator presses the spindle start push button switch 83 of a work head not in the loading station, a circuit is established from the wire 108 through the spindle stop push button switch 84, wire 110, spindle start push button switch 83, wire 111, operating solenoid 112 of relay 113, wire 114, and brush 115 in engagement with collector ring 116 to line 97, energizing the operating solenoid 112 of relay 113 and closing the normally open contacts 117 and 118 thereof. The closing of the normally open contact 117, which is in parallel circuit with contacts 120, 121 of the spindle start push button switch 83, maintains the relay 113 energized after the spindle start push button switch is released.

Contact 118 of relay 113 is in series circuit with similar contacts of similar relays on each of the work heads C and these contacts are closed when the spindle start push button switches 83 of the various work heads, including the work head in the loading station, are depressed. After all of the spindle start push button switches 83 have been depressed, the motor 59 which rotates the turret B, can be started by depressing the turret rotation start push button switch 88, establishing a circuit from the line 108 through the seven contacts corresponding with contact 118 of relay 113, which contacts are connected in series circuit, wire 122, contact 118, wire 123, brush 124, collector ring 125, wire 126, turret rotation stop push button switch 90, wire 127, turret rotation start push button switch 88, wire 128, operating solenoid 130 of motor controller 131, to line 97. Energization of the operating solenoid 130 of motor controller 131 closes the normally open main contacts 132, 133 and 134 thereof, connecting the turret rotation motor 59 and the pump motor 77 to the main power lines 95, 96 and 97 in such a manner that the motor 98 operates to rotate the turret B in the direction indicated by the arrow R, see Fig. 1. Simultaneously, an auxiliary contact 135, in parallel circuit with the turret rotation start push button switch 88 is closed, establishing a maintaining circuit for the operating solenoid 130 which continues the operation of the motors 59 and 77 after the turret rotation start push button switch is released.

As illustrated, the spindle rotation motors 25 have two speeds. However, motors having any number of speeds may be employed. In the present instance, the speed selection is determined by the speed selector switches 78 and 80 and any sequence of operations can be obtained by using the required number of stops properly located. For the present purposes, it will be assumed that during the cutting operation the motors 25 operate first at their low speed, subsequently at their high speed and again at their low speed. Referring to the last work head to pass through the loading station, when the spindle start push button switch 83 was depressed, a circuit was established from the wire 110 through the contacts 120, 136 of the spindle start push button switch 83, wire 137, operating solenoid 138 of relay 140, wire 114, brush 115, and collector ring 116 to line 97. Energization of the operating solenoid 138 of relay 140 closes the normally open contact 141 thereof, establishing a circuit from the line 110 through contacts 117 of relay 113, wire 111, normally closed limit switch 142, wire 143, contact 141, wire 137, etc., to line 97, which maintains the relay 140 energized after the spindle start push button switch 83 is released. Simultaneously with the energization of the operating solenoid 138 of relay 140, a circuit is established from the line 137 through normally closed contacts 144, 145 of limit switch 146, wire 147, closed contacts 148, 150 of high speed selector switch 80, wire 151, normally closed auxiliary contact 152 of high speed motor controller 153 located on the panel 154, wire 155, operating solenoid 156 of the low speed motor controller 157, wire 114, brush 115, and collector ring 116 to line 97. Energization of the operating solenoid 156 of low speed motor controller 157 closes the main power contacts 158, 160 and 161 thereof connecting the spindle motor 25 to the power lines 95, 96 and 97 in such a manner that the motor 25 operates at its low speed.

The speed selector switches 78 and 80 are of the roller type and are spring biased to the position shown in the wiring diagram. The normally closed contacts are adapted to be open and the normally open contacts are adapted to be closed by engagement with stops or cams, such as the stops 81 and 82. Referring again to the operation of the work head under consideration, as the work head moves upward to the rotation of the turret B, the high speed selector switch 80 is actuated by the stop 81 to open the normally closed contacts 148, 150 and close the normally open contacts 162, 163 thereof. The opening of the normally closed contacts 148, 150 interrupts the circuit to the operating solenoid 156 of the low speed motor controller 157 disconnecting the motor 25 from the power lines and closing the normally closed auxiliary contacts 164 of the low speed motor controller 157.

The closing of the normally open contacts 162, 163 of high speed selector switch establishes a circuit from the line 147 through the normally closed contacts 165, 166 of low speed selector switch 78, wire 167, normally open contacts 162, 163 of high speed selector switch 80, which are now closed, wire 168, normally closed auxiliary contact 164 of low speed motor controller 157, wire 170, operating solenoid 171 of high speed motor controller 153, and wire 114, etc., to line 97. Energization of the operating solenoid 171 of high speed motor controller 153 closes the normally open main contacts 172, 173, and 174 thereof connecting the motor 25 to the power lines 95, 96 and 97 in such a manner that the motor thereafter operates at its high speed. The connection to the main power lines is made through the collector rings 175, 176 and 177 and the brushes 178, 180 and 181 in contact therewith. Simultaneously with the closing of the main contacts 172, 173 and 174 of the high speed motor controller 157, normally open auxiliary contact 182 on said motor controller is also closed and auxiliary contact 152 opened. Auxiliary contact 182 is in parallel circuit with the contacts 152, 153 of high speed selector switch 80 and the closing thereof maintains the circuit to the operating solenoid 171 energized when the roller of the high speed selector switch 80 drops off the stop or cam 81. The fact that the normally closed auxiliary contact 152 of the high speed motor controller 153 is now open, which contact is in series circuit with the operating solenoid 156 of low speed motor controller 157, prevented this solenoid from becoming energized when the high speed selector switch 80 returned to its normal position.

The motor 25 continues to operate at its high speed until the work head has moved upward sufficiently to cause the roller of the low speed selector switch 78 to engage the stop or cam 82 and actuate the switch to open the normally closed contacts 165, 166. The opening of the normally closed contacts 165, 166 of low speed selector switch 78 interrupts the circuit to the operating solenoid 171 of the high speed motor controller 153 disconnecting the motor 25 from the power lines, opening auxiliary contact 182, and closing auxiliary contact 152. Upon the closing of contact 152, the circuit to the operating solenoid 156 of low speed motor controller 157 is reestablished from the wire 147 through the normally closed contacts 148, 150 of high speed selector switch 80, wire 151, auxiliary contact 152, wire 155, operating solenoid 156, wire 114, etc., to line 97.

The motor 25 continues to operate at its low speed until the limit switch 142 is opened by engagement with the stop 183, which does not occur until after the work has been completed. The opening of the limit switch 142 interrupts the circuit to the operating solenoid 156 of the low speed motor controller 157 as well as the operating circuit for the operating solenoid 138 of relay 140. As soon as the work spindle has stopped rotating the operator removes the finished work piece. Continued rotation of the turret B causes the roller of the work head to travel down the incline 58. As the work head moves in a downward direction, the roller of the limit switch 142 moves away from the stop 183 allowing the switch to close. As the work head approaches its lowest position, the limit switch 146 is actuated by the stop 186 to open the normally closed contacts 144, 145 and close the normally open contacts 184, 185 thereof. The closing of the normally open contacts 184, 185 reestablishes the circuit to the operating solenoid 138 of relay 140, closing the normally open contact 141 thereof. While the work head is in its lowest position, the operator inserts a new work blank. As the work head moves out of the loading station, the limit switch 146 is returned to its normal position as the roller 54 travels up the incline 57. The reclosing of the contacts 144, 145 of limit switch 146 reestablishes the circuit to the operating solenoid 156 of the low speed motor controller 157 to complete the cycle of operation.

When the spindle start push button switch 83 of the spindle head located in the loading station was depressed prior to starting the turret rotation motor 59, the relay thereof corresponding with the relay 113 was energized but the spindle rotation motor 25 thereof did not start because at that time either the limit switch corresponding with the limit switch 142 or the normally closed contacts of the limit switch corresponding with the limit switch 146 were open. However, the normally open contacts of the relay corresponding with relay 113 closed permitting the turret rotation motor 59 to be started and setting up the control circuit for the spindle rotation motor in such a manner that it would go through its cycle of operations without further attention. The speed selection stops 81 and 82 are adjustable and any desired number may be employed, from which it follows that within certain limits any sequence of operations of the motor 25 can be obtained. The normally open contacts 187, 188 of the low speed selector switch 78 permit the motor to be changed from high to low speed before the contact arm of the high speed selector switch 80 has cleared a high speed selector stop, such as the stop 81.

As previously stated, the wiring for only one of the work heads is shown in the drawings. It is also to be understood that in commercial practice, certain overload relays and other safety devices are employed. These devices have been omitted from the wiring diagram in an effort to make the same as simple as possible. It is also to be understood that certain of the features of the invention are applicable to stationary single spindle machines although the invention has been herein shown and described as embodied in a rotatable turret multiple spindle machine.

The invention has been herein illustrated and described in considerable detail, but I do not wish to be limited to the particular construction shown which may be varied within the scope of the present invention as will be apparent to those skilled in the art to which the invention relates. It is my intention to hereby cover all adaptations and modifications and uses of the invention herein disclosed that come within the practice of the art and/or the spirit and scope of the appended claims.

Having thus described my invention, what I claim is:

1. In a machine of the character referred to, the combination of a frame, a vertically movable work head slidably supported by said frame, a work supporting spindle carried by said work head for rotation about a vertical axis, an electric motor for rotating said work supporting spindle, means for supporting said electric motor in said work head with its rotor shaft in axial alignment with said work supporting spindle, a tool head slidably supported by said frame for movement in a horizontal plane and in a direction towards and from the axis of rotation of said work supporting spindle, a tool spindle rotatably supported in said tool head with its axis of rotation offset from and angularly disposed with respect to the axis of rotation of said work supporting spindle, means for moving said work head vertically whereby a relative feed movement is effected between a work blank connected to said work supporting spindle and a tool carried by said tool spindle in a direction generally parallel to the axis of rotation of the work spindle, and means for rotating said tool spindle in timed relation to the movement of said work head.

2. In a machine of the character referred to, the combination of a frame, a vertically movable work head slidably supported by said frame, a work supporting spindle carried by said work head for rotation about a vertical axis, an electric motor for rotating said work supporting spindle, means for supporting said electric motor in said work head with its rotor shaft in axial alignment with said work supporting spindle, means including planetary gearing for operatively connecting said motor and said work supporting spindle, a tool head slidably supported by said frame for movement in a horizontal plane and in a direction towards and from the axis of rotation of said work supporting spindle, means for moving said tool head, a tool spindle rotatably supported in said tool head with its axis of rotation offset from and angularly disposed with respect to the axis of rotation of said work supporting spindle, means for moving said work head vertically whereby a relative feed movement is effected between a work blank connected to said work supporting spindle and a tool carried by said tool spindle in a direction generally parallel to the axis of rotation of the work spindle, and means controlled by the movement of said work head for rotating said tool spindle in timed relation to the movement of said work head.

3. In a machine of the character referred to, the combination of a frame, a vertically movable work head slidably supported by said frame, a work supporting spindle carried by said work head for rotation about a vertical axis, an electric motor for rotating said work supporting spindle, means for supporting said electric motor in said work head with its rotor shaft in axial alignment with said work supporting spindle, a tool head slidably supported in a cylindrical aperture in said frame for movement in a horizontal plane and in a direction towards and from the axis of rotation of said work supporting spindle, means for moving said tool head, a tool spindle rotatably supported in said tool head with its axis of rotation offset from and angularly disposed with respect to the axis of rotation of said work supporting spindle, means for moving said work head vertically whereby a relative feed movement is effected between a work blank connected to said work supporting spindle and a tool carried by said tool spindle in a direction generally parallel to the axis of rotation of the work spindle, and means for rotating said tool spindle in timed relation to the movement of said work head.

4. In a machine of the character referred to, the combination of a frame, a vertically movable work head slidably supported by said frame, a work supporting spindle carried by said work head for rotation about a vertical axis, an electric motor for rotating said work supporting spindle, means for supporting said electric motor in said work head with its rotor shaft in axial alignment with said work supporting spindle, means including planetary gearing located between said motor and said work supporting spindle for operatively connecting the same, a tool head slidably supported in a cylindrical aperture in said frame for movement in a horizontal plane and in a direction towards and from the axis of rotation of said work supporting spindle, means for moving said tool head, a tool spindle rotatably supported in said tool head with its axis of rotation offset from and angularly disposed with respect to the axis of rotation of said work supporting spindle, means for moving said work head vertically whereby a relative feed movement is effected between a work blank connected to said work supporting spindle and a tool carried by said tool spindle in a direction generally parallel to the axis of rotation of the work spindle, and means for rotating said tool spindle in timed relation to the vertical movement of said work head.

5. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a vertically movable work head slidably supported by said turret, a work supporting spindle carried by said work head for rotation about a vertical axis, a tool head slidably supported in a cylindrical aperture in said turret for movement radially of the axis of rotation of said turret, and a tool spindle rotatably supported in said tool head with its axis of rotation offset from and angularly disposed with respect to the axis of rotation of said work supporting spindle; means for rotating said work supporting spindles; means for moving said work heads vertically whereby a relative feed movement is effected between work blanks supported by said work supporting spindles and tools carried by said tool spindles in a direction parallel to the axis of rotation of said work supporting spindles; and means for rotating said tool spindles in timed relation to the vertical feed movement of the work head with which it is associated.

6. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a vertically movable work head slidably supported by said turret, a work supporting spindle carried by said work head for rotation about a vertical axis, a tool head slidably supported in a cylindrical aperture in said turret for movement radially of the axis of rotation of said turret, and a tool spindle rotatably supported in said tool head with its axis of rotation offset from and angularly disposed with respect to the axis of rotation of said work supporting spindle; means for rotating said work supporting spindles; a common cam carried by said frame for moving said work heads vertically whereby a relative feed movement is effected between work blanks supported by said work supporting spindles and tools carried by said tool spindles in a direction parallel to the axis of rotation of said work supporting spindles; and means for rotating said tool spindles in timed relation to the vertical feed movement of the work head with which it is associated.

7. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a vertically movable work head slidably supported by said turret, a work supporting spindle carried by said work head for rotation about a vertical axis, an electric motor in said work head having its rotor shaft in axial alignment with said work supporting spindle for rotating the latter, a tool head slidably supported by said turret for movement radially of the axis of rotation of said turret, a tool spindle rotatably supported in said tool head with its axis of rotation offset from and angularly disposed with respect to the axis of rotation of said work supporting spindle; means for moving said work heads vertically whereby relative feed movements are effected between work blanks supported by said work supporting spindles and tools carried by said tool spindles in a direction parallel to the axis of rotation of said work supporting spindles; and means for rotating said tool spindles in predetermined relation to the vertical feed movement of the work head associated therewith.

8. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a vertically movable work head slidably supported by said turret, a work supporting spindle carried by said work head for rotation about a vertical axis, an electric motor in said work head having its rotor shaft in axial alignment with said work supporting spindle for rotating the latter, planetary gearing interposed between said rotor shaft and said work supporting spindle, a tool head slidably supported by said turret for movement radially of the axis of rotation of said turret, a tool spindle rotatably supported in said tool head with its axis of rotation offset from and angularly disposed with respect to the axis of rotation of said work supporting spindle; means for rotating said work supporting spindles; means for moving said work heads vertically whereby relative feed movements are effected between work blanks supported by said work supporting spindles and tools carried by said tool spindles in a direction parallel to the axis of rotation of said work supporting spindles; and means for rotating said tool spindles in predetermined relation to the vertical feed movement of the work head associated therewith.

9. In a machine of the character referred to, the combination of: a base; a turret rotatably supported by said base; a plurality of metal working units carried by said turret; means for rotating said turret whereby said units are moved in sequence through a loading station; each of said metal working units comprising a rotatable spindle, means for rotating said spindle, and means for controlling the actuation of said last-named means; and means for preventing the operation of said means for rotating said turret until a plurality of said means for controlling the actuation of said means for rotating said spindles have been actuated.

10. In a machine of the character referred to, the combination of: a base; a turret rotatably supported by said base; a plurality of metal working units carried by said turret; means for rotating said turret whereby said units are moved in sequence through a loading station; each of said metal working units comprising a rotatable spindle, means for rotating said spindle, and manual means for controlling the rotation of said spindle; and means for preventing the operation of said first-named means until a plurality of said manual means have been actuated.

11. In a machine of the character referred to, the combination of: a base; a turret rotatably supported by said base; a plurality of metal working units carried by said turret; an electric motor for rotating said turret whereby said units are moved in sequence through a loading station; each of said metal working units comprising a rotatable spindle, means for rotating said spindle, and means for controlling the rotation of said spindle; and means for controlling the actuation of said electric motor comprising mechanism for preventing the operation thereof until a plurality of said last-named means have been actuated.

12. In a machine of the character referred to, the combination of: a base; a turret rotatably supported by said base; a plurality of metal working units carried by said turret; an electric motor for rotating said turret whereby said units are moved in sequence through a loading station; each of said metal working units comprising a rotatable spindle, an electric motor for rotating said spindle, and means controlling the actuation of said electric motor comprising a manually operable control member; means for initiating the actuation of said first-mentioned electric motor; and interlocking means for preventing the operation of said first-mentioned means until all of said manually operable control means have been actuated.

13. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a work head supported by said turret, a work supporting spindle carried by said work head for rotation about a vertical axis, a tool head supported by said turret, a tool spindle rotatably supported in said tool head, means for rotating said work supporting spindle, and means for controlling the actuation of said last-named means; means for moving said work heads vertically whereby relative feed movements are effected between work blanks supported by said work supporting spindles and tools carried by said tool spindles in a direction parallel to the axis of rotation of said work supporting spindles; means for rotating said tool spindles; and means for preventing the operation of said means for rotating said turret until a plurality of said means for controlling the actuation of said means for rotating said work supporting spindles have been actuated.

14. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a vertically movable work head slidably supported by said turret, a work supporting spindle carried by said work head for rotation about a vertical axis, a tool head supported by said turret, a tool spindle rotatably supported in said tool head with its axis of rotation offset from and angularly disposed with respect to the axis of rotation of said work supporting spindle, means for rotating said work supporting spindle, and means including a manually operable control device for controlling the actuation of said last-named means; a common cam carried by said frame for moving said work heads vertically whereby relative feed movements are effected between work blanks supported by said work supporting spindles and tools carried by said tool spindles in a direction parallel to the axis of rotation of said work supporting spindles; means for rotating said tool spindles; and means for preventing the operation of said means for rotating said turret until a plurality of said manually operable control devices have been actuated.

15. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a vertically movable work head slidably supported by said turret, a work supporting spindle carried by said work head for rotation about a vertical axis, an electric motor for rotating said work supporting spindle, means including a manually operable control device for controlling the actuation of said motor, a tool head supported by said turret, a tool spindle rotatably supported in said tool head with its axis of rotation offset from and angularly disposed with respect to the axis of rotation of said work supporting spindle, and means for rotating said tool spindle; means for moving said work heads vertically whereby relative feed movements are effected between work blanks supported by said work supporting spindles and tools carried by said tool spindles in a direction parallel to the axis of rotation of said work supporting spindles; and means for preventing the operation of said means for rotating said turret until a plurality of said manually operable control devices have been actuated.

16. In a machine of the character referred to, the combination of: a base; a turret supported by said base for rotation about a vertical axis; a plurality of metal working units carried by said turret; means for rotating said turret whereby said units are moved in sequence through a loading station; each of said metal working units comprising a vertically movable work head slidably supported by said turret, a work supporting spindle carried by said work head for rotation about a vertical axis, an electric motor in said work head having its rotor shaft in axial alignment with said work supporting spindle for rotating the latter, planetary gearing interposed between said rotor shaft and said work supporting spindle, a tool head slidably supported by said turret for movement radially of the axis of rotation of said turret, means including a manually operable control device for controlling the actuation of said motor, a tool spindle rotatably supported in said tool head with its axis of rotation offset from and angularly disposed with respect to the axis of rotation of said work supporting spindle, and means for rotating said tool spindle; means for moving said work heads vertically whereby relative feed movements are effected between work blanks supported by said work supporting spindles and tool carried by said tool spindles in a direction parallel to the axis of rotation of said work supporting spindles; and means for preventing the operation of said means for rotating said turret until all of said manually operable control devices have been actuated.

OTIS E. STAPLES.